United States Patent [19]

Geus et al.

[11] Patent Number: 4,855,091
[45] Date of Patent: Aug. 8, 1989

[54] METHOD FOR THE PREPARATION OF CARBON FILAMENTS

[75] Inventors: John W. Geus, GJ Bilthoven, Netherlands; John W. Linowski, Midland, Mich.

[73] Assignee: The Dow Chemical Company, Midland, Mich.

[21] Appl. No.: 723,123

[22] Filed: Apr. 15, 1985

[51] Int. Cl.[4] .......................... D01D 5/00; D01F 9/08
[52] U.S. Cl. ........................................ 264/22; 264/24; 264/29.2; 264/29.6; 264/40.1; 264/65; 264/67; 264/81; 264/82; 264/105; 264/137; 264/145; 264/241; 264/257; 423/447.3; 423/447.7; 423/448; 423/449; 423/450
[58] Field of Search .................. 264/29.2, 24, 81, 82, 264/22, 29.6, 40.1, 65, 67, 105, 137, 145, 241, 257; 423/447.3, 447.7, 448, 449, 450

[56] References Cited

U.S. PATENT DOCUMENTS

| | | | |
|---|---|---|---|
| 2,957,756 | 10/1960 | Bacon | 423/447.3 |
| 3,378,345 | 4/1968 | Bourdeau et al. | 423/447.3 |
| 3,383,298 | 5/1968 | Hall et al. | 204/155 |
| 3,622,272 | 11/1971 | Milewski et al. | 156/612 |
| 3,664,813 | 5/1972 | Hollander | 156/613 |
| 3,816,609 | 6/1974 | Hamner | 423/652 |
| 4,391,787 | 7/1983 | Tibbetts | 423/458 |
| 4,404,177 | 9/1983 | Derbyshire et al. | 423/448 |
| 4,410,504 | 10/1983 | Galasso et al. | 423/453 |
| 4,435,375 | 3/1984 | Tamura et al. | 423/447.3 |
| 4,481,249 | 11/1984 | Ebneth et al. | 428/288 |
| 4,491,569 | 1/1985 | Tibbetts | 423/447.3 |
| 4,497,788 | 2/1985 | Bradley et al. | 423/447.3 |
| 4,565,683 | 1/1986 | Yates et al. | 423/447.3 |
| 4,565,684 | 1/1986 | Tibbetts et al. | 423/447.3 |
| 4,663,230 | 5/1987 | Tennent | 428/367 |

FOREIGN PATENT DOCUMENTS

| | | |
|---|---|---|
| 56004 | 7/1982 | European Pat. Off. . |
| 109165 | 5/1984 | European Pat. Off. . |
| 49-061421 | 6/1974 | Japan . |
| 52-107329 | 9/1977 | Japan . |
| 54-006891 | 1/1979 | Japan . |
| 54-77725 | 6/1979 | Japan . |
| 55-007533 | 1/1980 | Japan . |
| 55-162412 | 12/1980 | Japan . |
| 56-118913 | 9/1981 | Japan . |
| 57-117622 | 7/1982 | Japan . |
| 58-075705 | 5/1983 | Japan . |
| 58-104095 | 6/1983 | Japan . |
| 58-180615 | 10/1983 | Japan . |
| 58-197314 | 11/1983 | Japan . |
| 0030773 | 2/1984 | Japan ........................... 423/447.3 |
| 59-043120 | 3/1984 | Japan . |
| 59-059921 | 4/1984 | Japan . |
| 59-059976 | 4/1984 | Japan . |
| 59-076922 | 5/1984 | Japan . |
| 59-094620 | 5/1984 | Japan . |
| 59-152299 | 8/1984 | Japan . |
| 0199920 | 10/1985 | Japan ........................... 423/447.3 |
| 0231821 | 11/1985 | Japan ........................... 423/447.3 |
| 0231822 | 11/1985 | Japan ........................... 423/447.3 |
| 0011997 | 9/1886 | United Kingdom ............ 423/447.3 |
| 1469930 | 4/1977 | United Kingdom . |

OTHER PUBLICATIONS

Skokubai (Catalyst), Catalysis Society of Japan, vol. 26, No. 1, 1984, pp. 2–7.
Ohtani et al., "Carbon Fibers", Kindai Henshu Sha, (7/1/83), pp. 158–161, 710.

(List continued on next page.)

Primary Examiner—Hubert Lorin

[57] ABSTRACT

A method of preparing carbon filaments which comprises exposing a suitable thermostable substrate which is covered with reduced monocrystalline metal particles with a diameter of at least 5 nanometers to a carbon containing gas mixture at temperatures of about 250° up to about 700° C., for a period of time sufficient to form filaments of the desired length, and thereafter removing the substrate and/or the metal particles. The filaments are characterized by a crystalline graphitic structure and a morphology defined by a fishbone-like arrangement of the graphite layers along the axis of the filaments. A high carbide content is a prerequisite for the nucleation of the filamentous carbon with a fishbone like structure.

14 Claims, 1 Drawing Sheet

OTHER PUBLICATIONS

Tincher, "New Carbon and Graphite Fibers: Processes and Products," 1983, Chem Abstract 98(26):216652k.

Kureha Chemical Industry Co., Ltd., "Graphite Whisker," 1983, Chem Abstract 99(24):204057c.

Koyama et al., "Gas Phase Grown Carbon Fiber. Its Structure, Manufacture and Applications," 1982, Chem Abstract 97(14):111155b.

Katsuki Hiroaki et al., "The Effects of Various Metallic and Carbonaceous Substrates on the Vapor Phase Growth of Carbon Fiber from Benzene," 1981, Chem Abstract 94(22):176516c.

Endo Morinobu, "Structural Improvement of Carbon Fibers Prepared from Benzene," 11/76, *Japanese Journal of Applied Physics*, vol. 15, No. 11, pp. 2073–2076.

Fedoseev et al., "Growth of Graphite Whiskers," 1975, Chem Abstract 83(6):50876z.

Koyama et al., "Structure and Growth Process of Vapor-Grown Carbon Fibers," Apr. 1983, NASA Report No. NAS 1.15:77046

Koyama, "Formation of Carbon Fibers from Benzene," 1972, Chem Abstract 78(12):73427q.

Koyama, "Carbon Fibers Obtained by Thermal Decomposition of Vaporized Hydrocarbon," 1971, Chem Abstract 75(26):153415n.

METHOD FOR THE PREPARATION OF CARBON FILAMENTS

BACKGROUND OF THE INVENTION

The invention relates to a method for the production of carbon filaments having a crystalline graphitic structure and a morphology defined by a fishbone-like arrangement of the graphite layers along an axis of the filament.

Carbon fibers are forms of carbon which are known in the art and which have a diameter of, normally, from 5 to 15 micrometers. They are flexible, light in weight, thermostable, and to a large extent, chemically inert, and they are good thermal and electrical conductors. Such carbon fibers are produced by carbonizing an organic polymer yarn, for example, of rayon or polyacrylonitrile to form a fiber built up from a multitude of fibrils. The most important parameter to characterize carbon fibers is the preferred orientation, i.e., the extent to which carbon or graphite microcrystallites are oriented parallel to the fiber axis. The thermal and electrical conductivity as well as the intrinsic tensile strength and Young's modulus increase with increased preferred orientation.

Carbon fibers can be divided into two categories, low-modulus fibers having a Young's modulus below about 140 g Pa and high-performance fibers having a Young's modulus above about 170 g Pa and having a very high tensile strength.

It is also known to prepare high-performance carbon fibers from polymer fibers such as polyacrylonitrile fibers by carbonizing the fibers and subsequently subjecting the fibers, in an inert gaseous atmosphere, to an elevated temperature. To endow the fibers with the desired high mechanical strength, they must be subjected to a tensile stress at the very high recrystallization temperature. Partly as a result of the mechanical force applied, the graphite layers in the fiber have their planes oriented parallel to the axis of the fiber.

It is apparent that the procedures required for the production of carbon fibers by presently known methods is very expensive. As a result, it has up till now only been possible for carbon fibers to be used in applications where the required amount of fibers is relatively small and the price of the finished product is not critical. For large scale commercial applications, however, the cost of producing carbon fibers in large quantities is still prohibitive.

In a more recent development a new method of manufacture of graphite fibers has been disclosed in which the fibers are produced at a high yield by the pyrolysis of a hydrocarbon gas, U.S. Pat. No. 4,391,787 (G. G. Tibbetts). In this method, gaseous methane, or the like, is contacted with a chromium oxide film on one side of a thin hydrogen-permeable wall, while concurrently dissolving hydrogen into the opposite side of the permeable wall, and heating the wall and the gas to a temperature of from 925° to 1075° C. to form on the first wall surface graphite fibers from the carbon containing gas.

SUMMARY OF THE INVENTION

According to the present invention, it has now been found that high-performance carbon filaments (a single strand of carbonites as opposed to a carbon fiber made from a polymer fiber, for example) can be prepared by exposing a suitable thermostable support having deposited thereon substantially completely reduced monocrystalline metal particles to a carbon containing gas mixture.

The diameter of the metal particles is greater than about 5 nanometers (nm), and preferably greater than about 10 nm. The support and metal particles are exposed to a temperature of from about 250° up to about 700° C. to 800° C. The upper temperature range of 700° C. to 800° C. is contingent upon the experimental conditions such as the nature of the catalyst, the carbon delivering gas, and the like.

The carbon filaments of the invention are characterized by a unique crystalline graphitic structure and a morphology defined by a fishbone-like arrangement of the graphitic layers along the axis of the filaments. The carbon containing gas may be any suitable gas, such as carbon monoxide and hydrogen, methane or other hydrocarbons, or mixtures thereof.

More particularly, the invention resides in a method for the preparation of carbon filaments, comprising the steps of exposing a thermostable support having substantially completely reduced monocrystalline ferromagnetic metal particles to a carbon containing gas at a temperature of from about 250° C. up to about 700° C. to 800° C. for a period of time sufficient to promote epitaxial growth of graphite layers at the interface of the metal particles and the support forming carbon filaments of a desired dimension on the support, the upper temperature limits being contingent upon the stability of a metal carbide which is formed preceding the nucleation of filamentous carbon, said filaments being characterized by a crystalline graphitic structure and a morphology defined by a fishbone-like arrangement of the graphite layers along the axis of the filaments, and thereafter separating the carbon filaments from the support and/or the metal particles.

DESCRIPTION OF THE DRAWINGS

Hereinafter, the invention will be described in detail with reference to the accompanying drawings wherein.

DETAILED DESCRIPTION OF THE INVENTION

Figure 1:
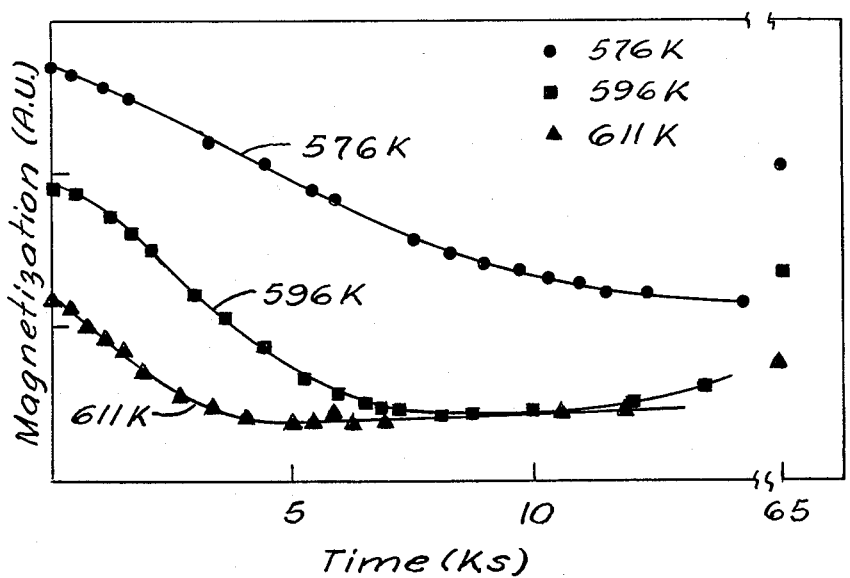
FIG. 1 is a graph showing the magnetization in arbitrary units vs. time.
Figure 2:
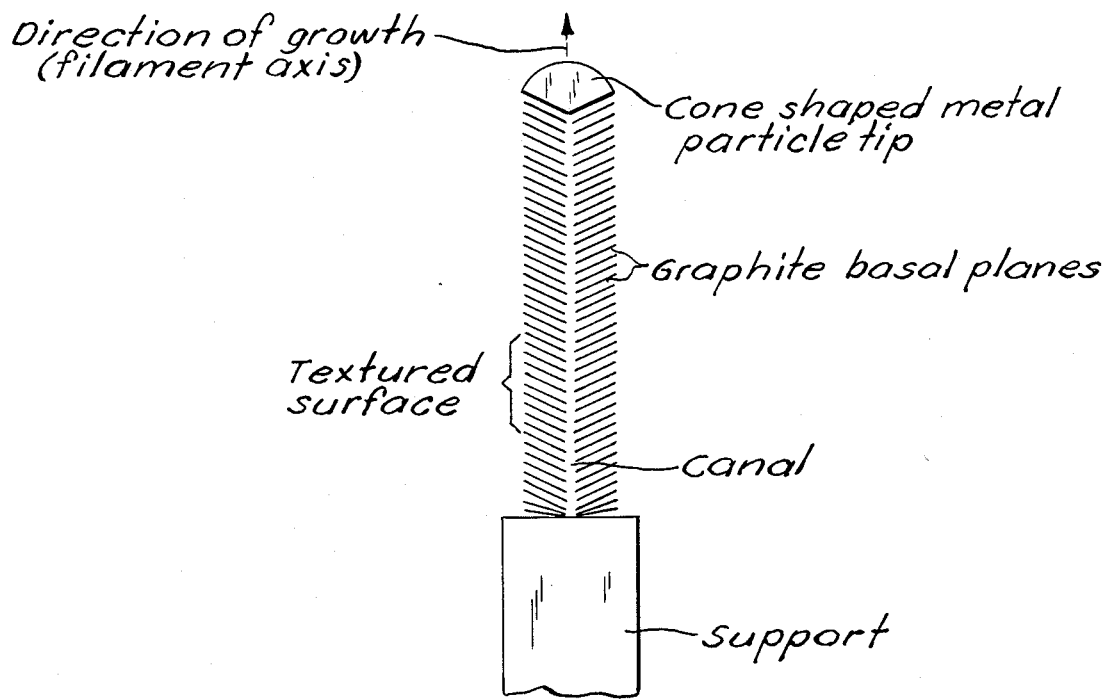
FIG. 2 is an idealized view of a carbon filament showing its morphological features.

In the method of the present invention, the metal particles to be used must have a reasonable affinity to carbon. By this it is meant that the metal particles must have a reasonable ability to transport carbon since the rate of carbon filament growth is equal to the rate of transport of carbon through the metal particle. For this reason, platinum or palladium particles can be used. However, copper which has a low affinity to carbon, for example, is unsuitable. Preferably, the metal particles to be used must be capable of forming unstable metal carbides. Particularly good results are obtained when iron, cobalt or nickel, or alloys of these metals are used as the metal particles.

The minimum diameter of the metal particles suitable for filament growth is about 5 nm. It has been found that when smaller particles are used, no satisfactory carbon filament growth can take place. Preferably, the minimum diameter of the metal particle is about 10 nm. Metal particles with a diameter larger than 10 nm are particularly suitable for filament growth.

It is of importance that the metal particles should be substantially fully reduced since metal particles which are not fully reduced have an oxidic contact with the thermally stable support which inhibits the growth of carbon filaments. Furthermore, the metal particles must not contain any grain boundaries, i.e., the metal particles must not contain any boundary surfaces of crystals having different crystal orientations.

Without wishing to be limited in any way, it is believed that the mechanism of the growth of the carbon filaments is the following. The carbon containing gas is decomposed to carbon and adsorbed at the metal-gas interface of the metal particles. Subsequently, the carbon atoms taken up into the surface of the metal particles migrate into the metal and either react with the metal to form a carbide, or dissolve into the metal.

With ferromagnetic metals, the formation of a carbide can be assessed by measuring magnetization. Since the saturation magnetization of nickel, iron and cobalt carbides is either zero or appreciably lower than that of the pure metal, the drop in magnetization exhibited on exposure of the metal particles to the carbon containing gas demonstrates that the carbon has reacted to form metal carbide.

After the formation of the metal carbide, or after the dissolution of carbon into the metal, the nucleation of carbon at the interface between the metal and the substrate proceeds. The graphite nuclei subsequently grows into carbon filaments. With ferromagnetic metals, magnetization passes through a minimum on exposure of the metal particles to a carbon containing gas. This change in magnetization can be interpreted to be due to the nucleation of graphite after the formation of the metal carbides by reaction of the metal with the carbon containing gas.

With metals that cannot react to form bulk carbides, the nucleation of graphite proceeds from carbon atoms dissolved in the metal. Since the amount of carbon that can be dissolved into metals not capable of reacting to form a bulk carbide is relatively small, the nucleation of graphite at the interface with the substrate proceeds presumably more slowly.

The growth of graphite layers from the metal particles leads to the formation of carbon filaments. Presumably, the graphite layers are formed by epitaxial growth at the interface of the metal or perhaps metal carbide surface and the support. Due to the interaction between the graphite crystallites and the metal particle, the diameter of the growing carbon filament remains substantially equal to the diameter of the metal particle. The growth of graphite layers at the metal-carbon interface is determined by the rate of transport of carbon through the metal particle. Consequently, the growth of graphite at the metal-graphite interface is more rapid at those sites which are closer to the metal-gas interface and, conversely, the growth of graphite at the metal-graphite interface is less rapid at those sites which are more distant from the metal-gas interface. Thus, the different rates of transport of carbon through the metal particles leads to different rates of growths of graphite at the metal-graphite interface resulting in a fishbone-like structure.

Stated another way, the metal particle is pushed up by graphite layers which are sequentially produced at the interface. However, the rate at which carbon atoms are being transported varies at different sites of the interface. This is due to the fact that the rate of migration of carbon atoms through the metal particles determines the rate of growth of the carbon filaments. Since the length of the path to be travelled by carbon atoms migrating from different sites of the metal-gas interface to the metal-carbon interface varies, the number of carbon atoms per unit time arriving at the interface varies according to the relative locations. As a result, stacked graphite layers are formed, leading to the desired fishbone-like structure.

The number of carbon filaments growing per unit area of support can be varied by changing the number of metal particles, per unit area of support surface. A small number of metal particles per unit area of support surface results in a low density of carbon filaments on the support surface, whereas a large number of metal particles per unit area of support surface leads to a dense network of carbon filaments.

The size of the metal particles can be controlled by, for instance, sintering the metal particles at an elevated temperature. Consequently, the diameter of the carbon filaments can be controlled by controlling the size of the metal particles. It is important that the size distribution of the metal particles should preferably be in a narrow range so that the filaments produced will exhibit a correspondingly uniform diameter distribution.

The supported metal particles used in the method according to the present invention can in principle be produced using techniques which are known for the production of supported metal catalysts, and in principle, the same carrier materials, e.g. silica, alumina, and other inert support materials can be used provided that such support materials exhibit desirable metal particle-support interactions to promote the formation of carbon filaments from the supported metal particles.

The metal particle-support systems must satisfy certain requirements, however, and these should be taken into account, in particular those factors which control the diameter of the particles and their distribution. Only those methods and supports which produce metal particles of substantially uniform diameters are suitable for the purposes of this invention. It will be obvious, of course, that for certain applications, the particle size may vary to produce filaments having a somewhat non-uniform diameter distribution.

In the production of the metal particle-support systems suitable for use in the method according to the present invention, it is of importance to achieve a high loading with completely reduced metal particles. When the density of metal particles per unit area of the support is too high, the carbon filaments produced are shorter in length than when the density of the metal particles per unit area is low. Accordingly, the length of filament growth on the support can be controlled by properly adjusting the distribution density of metal particles on the support.

One suitable method of producing metal particle-support systems according to the present invention is by vapor deposition of a metal, for example, nickel, on a non-metallic support made of, for example, alumina, followed by a thermal treatment of the support (with the metal particles adhered to the support) in a non-oxidizing atmosphere. Another suitable method is the well-known deposition-precipitation technique followed by an appropriate reduction treatment, which produces the desired size of metal particles. Other well-known techniques for producing metal particle-support systems can be used to advantage such as, for example, solution deposition; electro-deposition; colloidal-metal deposition, and the like.

A particularly suitable technique is the decomposition of a gaseous carbonyl of the desired metal, or a mixture of gaseous carbonyls of the desired metal, or of gaseous metal-organic compounds that can be thermally decomposed. If such procedures are carried out using the support with a fluid-bed reactor, a particular advantage is that both the supported metal-particle system can be produced and the carbon filaments can be formed and grown in the same reactor.

In the method according to the invention, the thermodynamic conditions defined by the correct temperature and pressure and composition of the different reactants and resulting products play an important role in the filament growth process. In particular, the choice of temperature is preferably from about 250° up to about 700° C. to 800° C. but must not be higher than that at which the corresponding metal carbides formed are still stable.

It is noted that the phenomenon of the formation of carbon deposits has been extensively investigated and described in the literature. Thus, various forms of carbon deposits, including the filamentary form, are described in publications by Baker et al. and Rostrup Nielson (*Journal of Catalysis,* 26, 51–62 (1972) and *Journal of Catalysis,* 48, 155–165 (1977)). These publications are concerned, however, with research on conventional supported metal catalysts which provide for a large support surface area at a low metal particle loading on the support surface.

Thus, the authors, in the aforementioned publications, determined that the carbon microcrystallites in the carbon filaments had a low degree of orientation and, hence, the mechanical strength was weak. Measurements of the gas phase in equilibrium with the carbon filaments were interpreted to indicate that the thermodynamic stability of the carbon in the filaments was appreciably less than that of graphite. This also was considered to indicate that the crystallinity of the filaments was low.

Surprisingly, the mechanical strength of the carbon filaments prepared according to the present invention is very high. In fact, the strength of the filaments is so high that in the use of alummina as the support structure, the filaments were growing into the alummina causing a complete disintegration of the support.

It can be established, especially by the selected area electron diffraction method, that the carbon filaments contain symmetrically arranged or stacked crystalline graphite layers forming the hereinbefore described fishbone-like structure. The presence of stacked graphite layers, their orientation, and the resulting mechanical strength have thus far not been recognized by investigators in this area of endeavor.

In the method of the present invention, growth of the carbon filaments on the metal particle-support system leads to a dense network of carbon filaments containing the residues of the disintegrated support and exhibiting a metal particle at the growth end of the filament. During the growth of the filaments, it is important that the reactor is sufficiently large to accommodate an appreciable increase in volume of the growing filaments. The reactor may be of any suitable type, the choice of which is generally determined by the specific configuration (length, density, etc.) of the carbon filament bundles obtained. To avoid any spacial volume limitations, a fluid-bed reactor could be used. In such a device, the support and metal particles are suspended in a fluidized state by means of a flowing gas which includes a source of carbon as a raw material for the growth of carbon filaments on the support.

In the method according to the invention, a so-called secondary growth of the diameter of the carbon filaments can be accomplished by exposing the formed filaments having the fishbone like structure to a temperature above about 900° C. in the presence of a carbon-containing gas. It is conceivable that the secondary carbon growth on the external surface of the filament may give origin to a composite filament structure of unique mechanical strength. Such a structure will be somewhat analagous to a plywood composite. At the higher temperatures, further growth of the filaments in the longitudinal direction does not take place, but carbon is deposited on the outer surfaces of the filaments thereby enlarging the diameter of the filaments. To maintain a reasonably uniform diameter of the filaments, the accessibility of the filaments to the gaseous phase must not differ markedly within the reactor. This condition may be particularly well satisfied in a fluidized-bed reactor in which an excellent accessibility of the filaments to the gaseous phase can take place.

If desired, the filaments formed in accordance with the present invention can be separated from the support and/or the metal particles by a chemical or a mechanical treatment. For example, if the support is formed of silica, it can be rapidly dissolved in an alkaline solution. Likewise, if both the metal particles and the support must be removed, the use of an alumina support is attractive in that an acid solution leads to the dissolution of both the alumina support and the metal particles.

According to a further embodiment of the invention, the isolated carbon filaments (without the support and/or metal particles) can be combined with a molten polymer or monomer, or mixtures thereof, which is subsequently polymerized to form a filament-reinforced polymer composite. If the filaments are randomly oriented in the composite, the filament impregnated materials will be stronger in every direction and will not exhibit a more pronounced mechanical strength in any particular direction.

When a high mechanical strength in one direction is required, another procedure according to the invention can be utilized. After combining the carbon filaments with a molten polymer or monomer, or mixture thereof, the carbon filaments are dispersed in the molten mass and the suspension thus obtained is subjected to a mechanical shear whereby the carbon filaments are oriented in a direction parallel to the direction of polymer flow. Subsequent solidification or polymerization fixes the orientation of the carbon filaments within the solidified polymer.

Filaments made at temperatures of from about 250° and up to about 700° C. to 800° C. display a resistance to compression that is much higher than that to tension. Even though these filaments have a high resistance to compression, they can still be used to great advantage to produce composites having a high tensile strength. To obtain the objective, a mixture of these filaments and polymeric material can be subjected to pressure prior to solidification of the mixture to form a polymer composite having higher tensile strength.

According to another aspect of the invention, ferromagnetic particles, such as nickel, metallic iron or alloys thereof can be used to grow carbon filaments. These metal particles are located at the tip of the filaments. Since these particles are ferromagnetic, the filaments will become oriented in an electric and/or a magnetic field. When filaments having ferromagnetic particles at their ends, or when filaments having ferromagnetic particles at their ends in combination with molten polymers, monomers or mixtures thereof, are exposed to an electric and/or magnetic field, oriented filaments are produced, or oriented fibers are produced during setting of the polymer to produce a composite with oriented filaments. In the case of composites suitable procedures known to the manufacturer of magnetic tapes can be used.

According to still another embodiment of the invention, after the filaments have been formed, the temperature is greatly increased to above about 1000° C. and up to about 1800° C. In this way, a reorientation of the crystals in the filaments is accomplished, resulting in enhanced crystallinity and improved physical properties of the filament.

When ferromagnetic metal particles are used for the growth of the carbon filaments, these filaments can be oriented in a parallel relationship with each other by placing the substrate in an electric or magnetic field having the desired strength to promote growth of the fibers in a parallel manner. As herein before stated, when filaments of a greater diameter are desired, relatively thin filaments with a fishbone like structure provide an outer surface which is readily accessible to gas molecules, so that the filaments can be exposed to a carbon-containing gas at an elevated temperature of from about 900° to about 1100° C., i.e., a temperature at which the filaments no longer grow in a longitudinal direction. After completion of the treatment at such elevated temperature, the temperature can be further raised in excess of about 1100° and more advantageously up to about 1800° C. In view of the fact that the ferromagnetism decreases and finally disappears at elevated temperatures, it is desirable to keep the ends of the filaments, where the ferromagnetic particles are present, at a lower temperature.

According to a further embodiment of the invention, stretched carbon fibers of the prior art, or filaments of the invention can be subjected to a high temperature in a narrow zone, as viewed in the longitudinal direction, of the fibers or filaments, which narrow temperature zone is swept over the fibers or filaments. Preferably, this narrow high temperature zone is produced by using a high-frequency generator. This method therefore is analogous to zone melting used for the production and purification of silicon monocrystals.

The carbon filaments produced by the method according to this invention can be used for all purposes hitherto known for (high performance) carbon filaments. More particularly they can be used, by virtue of their excellent mechanical and electrochemical properties, for the manufacture of electrodes for electrochemical applications. For this purpose, the fibers are preferably grown using a flat substrate in a restricted volume, optionally in the presence of an electric or magnetic field. As a result of the limited volume available, the resulting network of filaments will be very dense. The metal tips can subsequently be removed by treatment with an acid since the carbon filaments do not dissolve in an acid. If after the formation of the filaments the temperature is raised preferably to above about 900° C., while maintaining the atmosphere of the carbon-containing gas mixture, carbon deposits will grow on the filaments so that an extremely dense and monolithic block of graphitized carbon filaments is produced.

EXAMPLE 1

Preparation of Ni-on-silica Substrate Presursor 2,475.7 g $Ni(NO_3)_2 \cdot 6H_2O$ and 1,200 g of urea were dissolved into 10 lit of water. Subsequently 500 g of silica of a surface area of 300 $m^2/g$ were suspended into the solution (Degussa,). The suspension was heated to 368° K. under vigorous stirring and kept for 24 hours at that temperature. After that period the dissolved nickel was virtually completely precipitated. The green silica loaded by the precipitated nickel was separated from the liquid and thoroughly washed. Next it was dried at 403° K. for 24 hours. The dry mass was subsequently pressed to tablets of a diameter of about 1.5 mm and a thickness of about 4 mm. The tablets were cut by a knife into particles of 0.15 mm to 0.30 mm. 1 to 3 g of the above nickel-loaded particles were brought into a tubular quartz reactor whose internal diameter was 10 mm. The material was dehydrated in a flow of 10% $H_2$ in nitrogen for at least 72 hours at 723° K. To raise the degree of reduction the nickel particles were finally kept in the $H_2/N_2$ flow for one hour at 950° K.

EXAMPLE 2

Preparation of an Iron-on-δAlumina Substrate Precursor 500 g of alumina of a surface area of 80 $m^2/g$ (Degussa C) were suspended into 3 lit of water. The temperature of the suspension was raised to 353° K. Subsequently a soda solution and a solution of 3,615 g of $Fe(NO_3)_3 \cdot 9H_2O$ in 5 lit of water were injected into the suspension below the level of the liquid through tubes of an internal diameter of 2 mm. The rate of the injection of the soda solution was controlled so as to keep the pH at a constant level of 6.0. After completion of the injection of the iron solution the brown alumina loaded with the iron was separated from the carrier and thoroughly washed. The washed material was dried at 393° K. for 24 hours. Subsequently the dried mass was pressed into tablets of a diameter of about 1.5 m and a thickness of about 4 mm. The tablets were cut by a knife into particles of 0.15 mm to 030 mm. 1 to 3 g of the particles thus obtained were loaded into a tubular quartz reactor of an internal diameter of 10 mm. The iron was reduced by keeping the particles in a flow of 10% $H_2$ in argon at 873° K. for at least 10 hours. The reduction was completed by keeping the mass in the $H_2$/Argon flow at 950° K. for at least one hour.

EXAMPLE 3

Growth of Carbon Filaments

Carbon filament growth was accomplished by introducing gas mixtures typically containing from about 1 to about 10 volume percent of a carbon-bearing gas. The gas mixture was fed to a quartz reactor having an inside diameter of 10 millimeters and containing from about 1 to about 3 grams of a pelleted catalyst. The catalyst pellets had a diameter of from about 0.15 mm to 0.30 millimeters.

The behaviour of nickel catalyst particles concurrent with growth of filamentous carbon was studied using freshly reduced 50 weight % Ni/SiO2 catalyst, reduced at 870° K. A gas mixture of 10 Vol. % methane in nitrogen was introduced into the quartz reactor at a flow rate of 0.8 $cm^3/s$. Methane was chosen as the source of carbon to prevent Ostwald ripening of the nickel particles due to transport via Ni(CO)$_4$.

Magnetization measurements were made as a function of time to gain an insight into the growth mechanism of the filamentous carbon. The magnetization was followed during carbonization at three different temperatures, namely 576° K., 596° K., and 611° K. Initially a decrease of the magnetization was observed. Having passed through a minimum, the magnetization increased gradually up to 70% of the original valve, as shown in FIG. (2). These changes in magnetization were associated with the formation of a metal carbide preceding the nucleation of filaments of graphitic carbon. Electron microscopy revealed that only nickel particles with a diameter larger that 10 nm were involved exclusively in filament growth. The observation of the gradual increase of magnetization indicates that after nucleation of filamentous carbon the carbon content of the catalyst particles is significantly lower than the carbon content at the early stages of carbonization.

In a similar experiment, a mixture of CO/H$_2$ at a ratio of 0.5/1 was employed. The growth of graphitic filaments was observed. The filaments were observed to have relatively electron-transparent canals along their axes and a textured structure. Nickel particles at the tip of these filaments exhibited a cone-shaped appearance. Selected area diffraction experiments were performed on a filament having a diameter of 70 nm. The filament was striking in its appearance by its straightness. Such a filament was especially suited for analysis of its carbon microstructure, as it contains only one well-defined direction of its axis. It was noted that two distinct orientations of the graphite layers were present. These two different orientations were localized on opposite sides of the filament axis. This microstructure can be represented by a fishbone like arrangement of the graphite basal planes along the filament axis as shown in FIG. (2).

We claim:

1. A method for the preparation of carbon filaments, comprising the steps of exposing a thermostable support having substantially completely reduced monocrystalline ferro-magnetic metal particles to a carbon containing gas at a temperature of from about 250° C. up to about 700° C. to 800° C. for a period of time sufficient to promote epitaxial growth of graphite layers at the interface of the metal particle and the support, substantially each of said metal particle having a particle size of at least about 5 nanometers, forming carbon filaments on the support, the upper temperature limit of from 700° C. to 800° C. being contingent upon the stability of a metal carbide which is formed preceding the nucleation of filamentous carbon, said filaments being characterized by a crystalline graphitic structure and a morphology defined by a fishbone-like arrangement of the graphite layers along an axis of the filaments, adjusting loading of the support surface with the metal particles prior to the step of exposing the support and metal particles to the carbon containing gas to control the desired number of the carbon filaments per unit area of support surface, and thereafter separating the carbon filaments from the support.

2. The method of claim 1, including the step of employing monocrystalline metal particles on the support surface which are able to form unstable metal carbides.

3. The method of claim 1, wherein the ferromagnetic particles are selected from the group consisting of iron, cobalt, nickel, and alloys thereof.

4. The method of claim 1, wherein the metal particles have a particle size of at least about 10 nanometer (nm).

5. The method of claim 1, wherein said ferro-magnetic particles are located at the ends of the carbon filaments, and subjecting said filaments and particles to an electric field, a magnetic field, or a combination of an electric and magnetic field.

6. The method of claim 1, wherein, after completion of longitudinal growth of the carbon filaments, they are subjected to a controlled amount of a carbon-containing gas at a temperature at which the fibers no longer grow in said longitudinal direction, said temperature being in the range of from about 900° to about 1100° C.

7. The method of claim 1 or 6, wherein the carbon filaments are subjected to a temperature of from about 1100° to about 1800° C., in the absence of a carbon-containing gas, to effect a re-orientation of the crystals in the carbon filaments.

8. The method of claim 1, wherein a bundle of parallel carbon filaments is grown on the support covered by metal particles.

9. The method of claim 1, wherein said support is selected from the group consisting of non-metallic materials, metals not forming bulk carbide metal alloys, metal oxides, metal carbides, and metal sulfides.

10. The method of claim 9, wherein said non-metallic materials are selected from the group consisting of carbon, silica, alumina, and other inert support materials which exhibit desirable metal particle-support interactions to promote the formation of carbon filaments from the supported metal particles.

11. A method for the preparation of reinforced polymers comprising the steps of exposing a thermostable support having substantially completely reduced monocrystalline ferro-magnetic metal particles to a carbon containing gas at a temperature of from about 250° C. up to about 700° C. to 800° C. for a period of time sufficient to promote epitaxial growth of graphite layers at the interface of the metal particle and the support, substantially each of said metal particle having a particle size of at least about 5 nanometers, forming carbon filaments on the support, the upper temperature limit of from 700° C. to 800° C. being contingent upon the stability of a metal carbide which is formed preceding the nucleation of filamentous carbon, said filaments being characterized by a crystalline graphitic structure and a morphology defined by a fishbone-like arrangement of the graphite layers along an axis of the filaments, adjusting loading of the support surface with the metal particles prior to the step of exposing the support and metal particles to the carbon containing gas to control the desired number of the carbon filaments per unit area of support surface, separating the carbon filaments from the support, and impregnating the carbon filaments with a molten polymer, a monomer, or a mixture thereof, that is subsequently polymerized.

12. A method for the preparation of a reinforced polymer, comprising the steps of exposing a thermostable support having substantially completely reduced monocrystalline ferro-magnetic metal particles to a carbon containing gas at a temperature of from about 250° C. up to about 700° C. to 800° C. for a period of time sufficient to promote epitaxial growth of graphite layers at the interface of the metal particle and the support, substantially each of said metal particle having a particle size of at least about 5 nanometers, forming carbon filaments on the support, the upper temperature limit of from 700° C. to 800° C. being contingent upon the stability of a metal carbide which is preceding the nucleation of filamentous carbon, said filaments being characterized by a crystalline graphitic structure and a morphology defined by a fishbone-like arrangement of the graphite layers along an axis of the filaments, adjusting loading of the support surface with the metal particles prior to the step of exposing the support and metal particles to the carbon containing gas to control the desired number of the carbon filaments per unit area of support surface, separating the carbon filaments from the support, dispersing the carbon filaments in a molten polymer, a monomer, or mixture thereof, subjecting the suspension thus obtained to a shear force, and polymerizing the molten polymer, monomer, or mixture thereof.

13. A method for the preparation of a reinforced polymer, comprising the steps of exposing a thermostable support having substantially completely reduced monocrystalline ferro-magnetic metal particles to a carbon containing gas at a temperature of from about 250° C. up to about 700° C. to 800° C. for a period of time sufficient to promote epitaxial growth of graphite layers at the interface of the metal particle and the support, substantially each of said metal particle having a particle size of at least about 5 nanometers, forming carbon filaments on the support, the upper temperature limit of from 700° C. to 800° C. being contingent upon the stability of a metal carbide which is formed preceding the nucleation of filamentous carbon, said filaments being characterized by a crystalline graphitic structure and a morphology defined by a fishbone-like arrangement of the graphite layers along an axis of the filaments, adjusting loading of the support surface with the metal particles prior to the step of exposing the support and metal particles to the carbon containing gas to control the desired number of the carbon filaments per unit area of support surface, separating the carbon filaments from the support with the metal particles attached to the ends of the filaments, dispersing the carbon filaments in a molten polymer, monomer, or mixture thereof, and subjecting the suspension to an applied external electric and magnetic field or a combination of an electric and magnetic field during solidification.

14. A method for the production of an electrode, comprising the steps of exposing a thermostable support having substantially completely reduced monocrystalline ferro-magnetic metal particles to a carbon containing gas at a temperature of from about 250° C. up to about 700° C. to 800° C. for a period of time sufficient to promote epitaxial growth of graphite layers at the interface of the metal particle and the support, substantially each of said metal particle having a particle size of at least about 5 nanometers, forming carbon filaments on the support, the upper temperature limit of from 700° C. to 800° C. being contingent upon the stability of a metal carbide which is formed preceding the nucleation of filamentous carbon, said filaments being characterized by a crystalline graphitic structure and a morphology defined by a fishbone-like arrangement of the graphite layers along an axis of the filaments, adjusting loading of the support surface with the metal particles prior to the step of exposing the support and metal particles to the carbon containing gas to control the desired number of the carbon filaments per unit area of support surface, raising the temperature to above about 900° C. while maintaining the atmosphere of the carbon-containing gas mixture to enhance the growth of carbon deposits on the filaments to form a dense and homogeneous block of carbon, and separating the carbon block from the support.

* * * * *